United States Patent Office 3,654,145
Patented Apr. 4, 1972

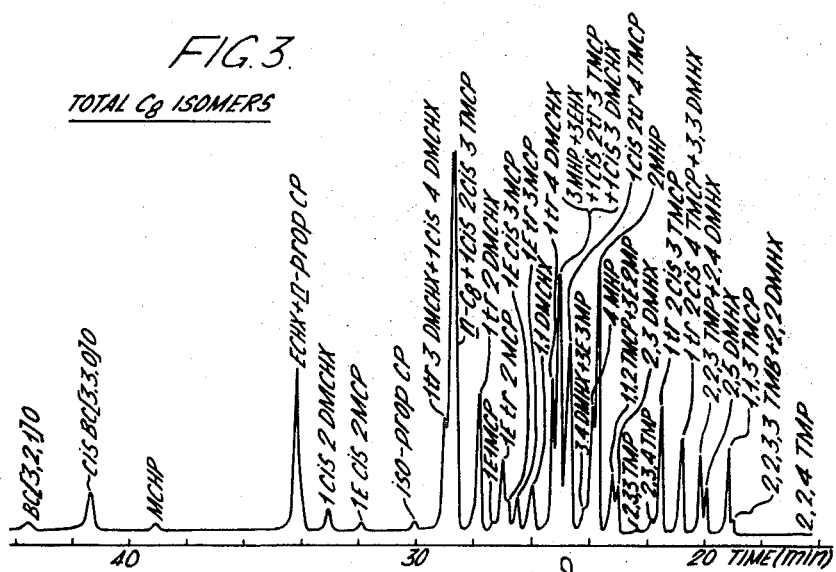
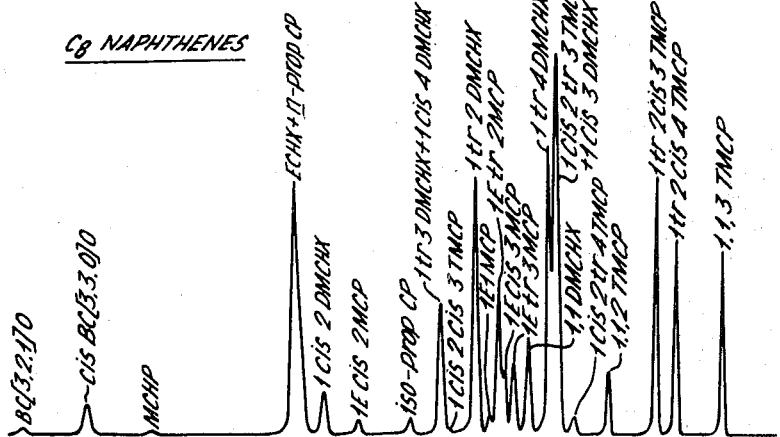
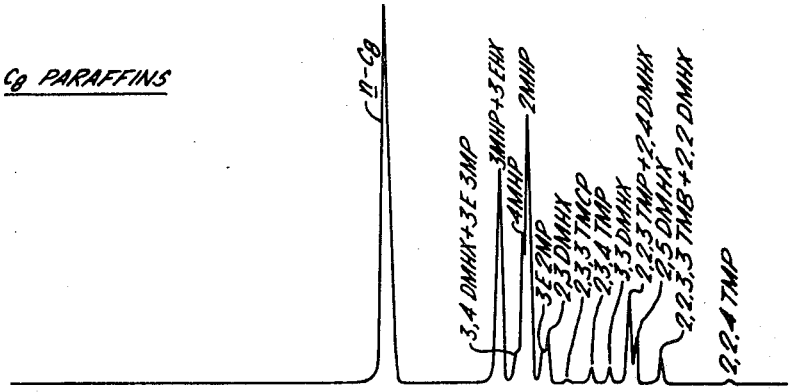
FIG. 3

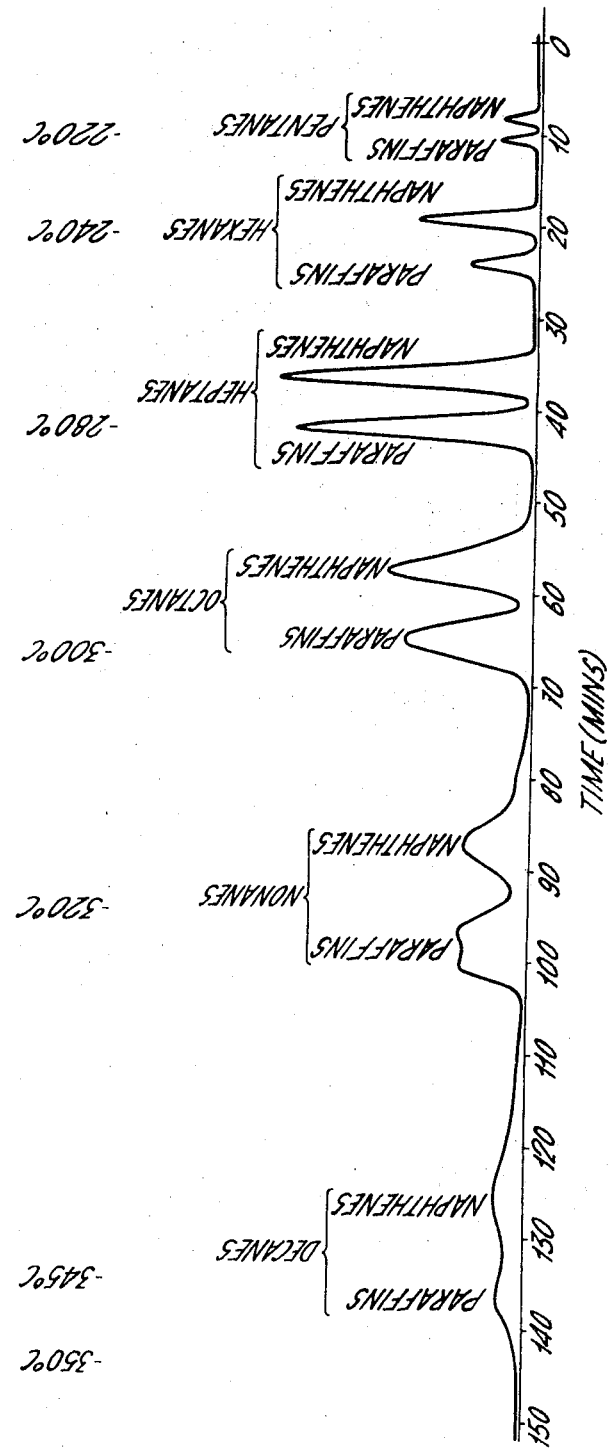

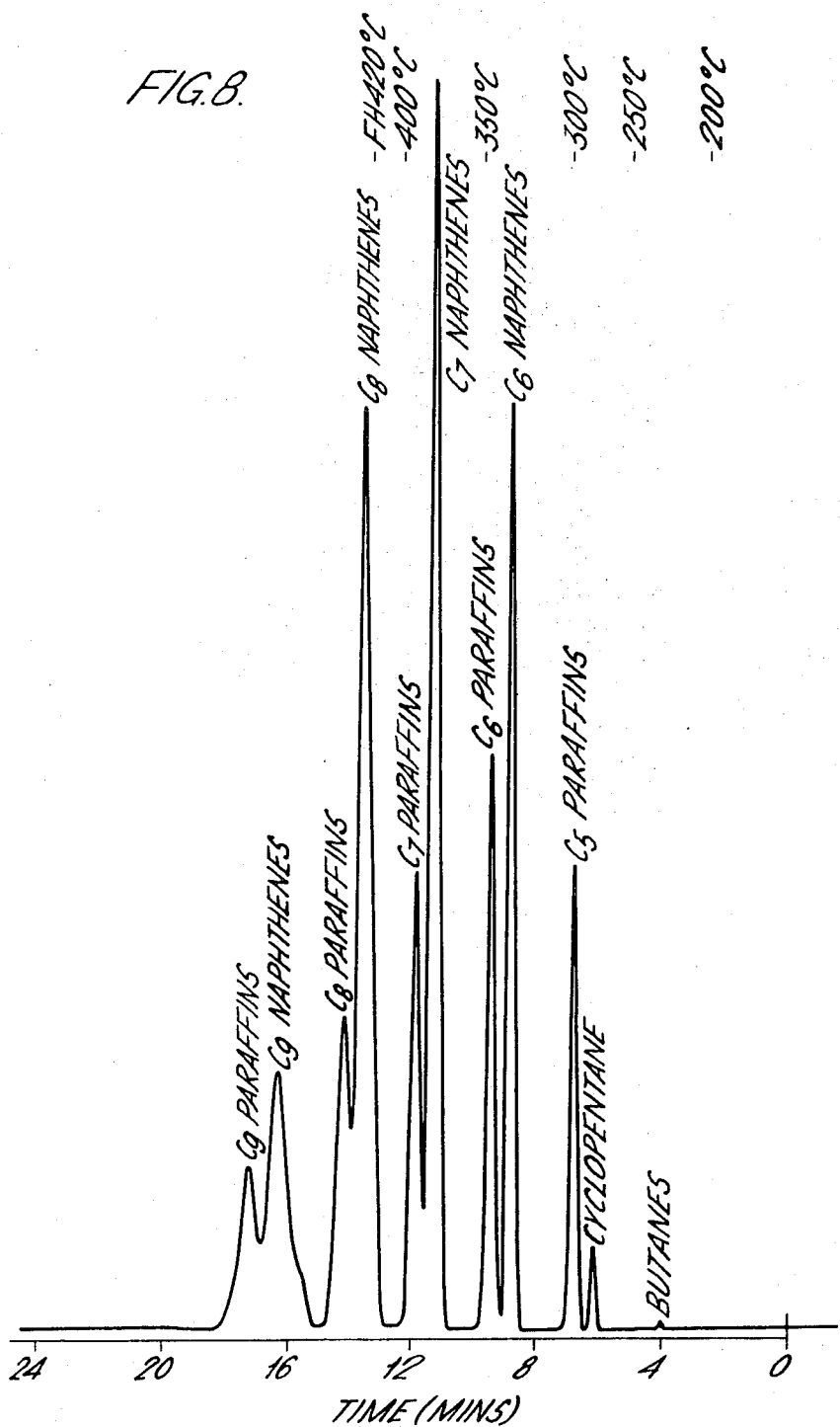

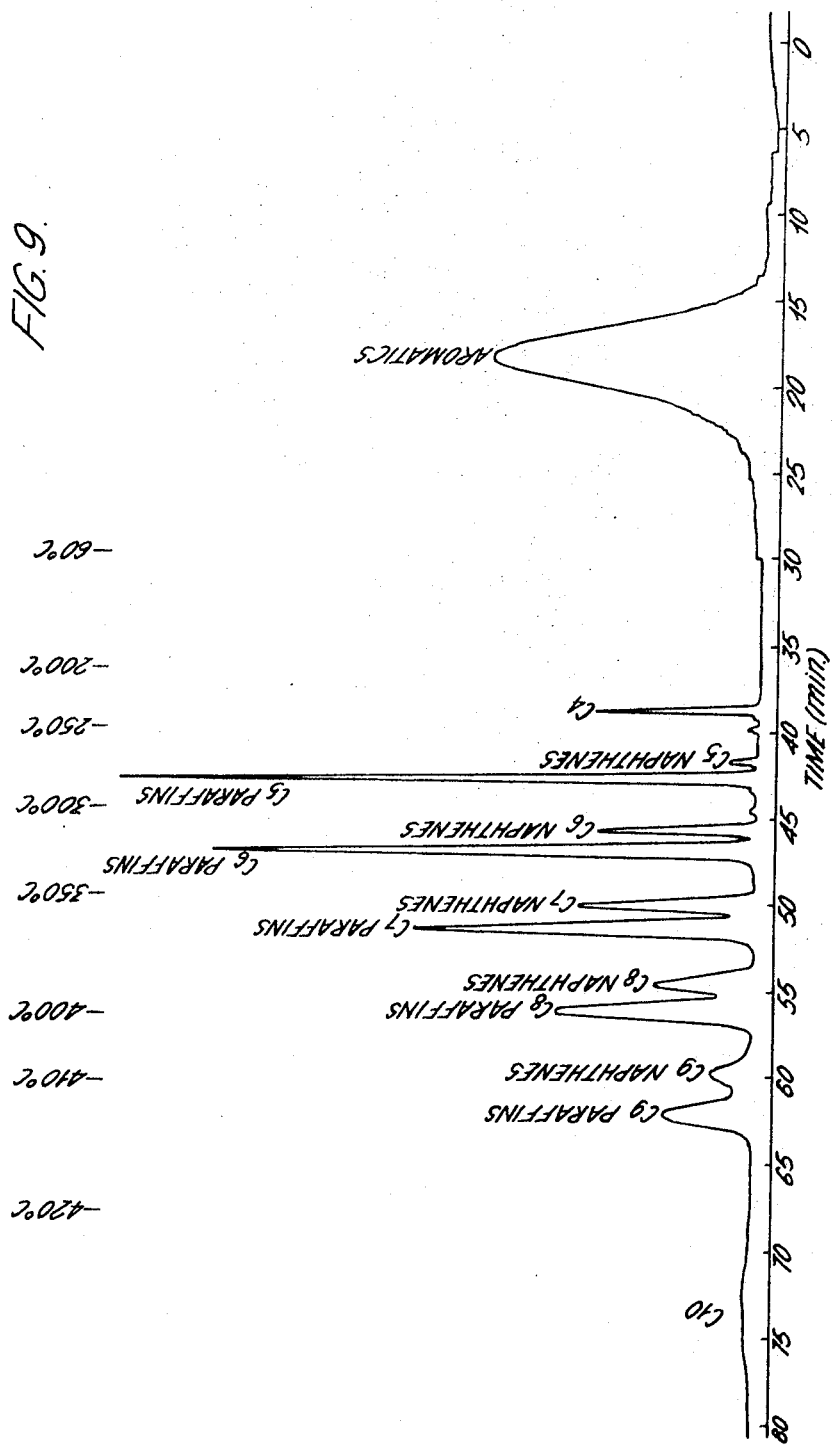

3,654,145
DISCOVERY IN SEPARATION OF HYDROCARBONS
John Vincent Brunnock, deceased, late of Frimley, England, by Pamela Mary Brunnock, legal representative, Frimley, and Leonard Arthur Luke, Ashford, England, assignors to the British Petroleum Company Limited, London, England
Filed Feb. 17, 1969, Ser. No. 800,376
Claims priority, application Great Britain, Feb. 21, 1968, 8,407/68; July 24, 1968, 35,237/68
Int. Cl. C07c 7/12
U.S. Cl. 208—310
13 Claims

ABSTRACT OF THE DISCLOSURE

Hydrocarbon mixtures containing paraffinic and naphthenic hydrocarbons differing in carbon number by at least 2 are separated into fractions consisting substantially of naphthenic or paraffinic hydrocarbons of the same carbon number by passing the mixture in the vapour phase, together with an inert carrier gas, through a column of a molecular sieve having pore diameters greater than 5 A. The column is temperature programmed within the range 40–250° C. above the average boiling point of the highest carbon number components present and the fractions are recovered from the bed as successive effluents.

---

Figure 1:
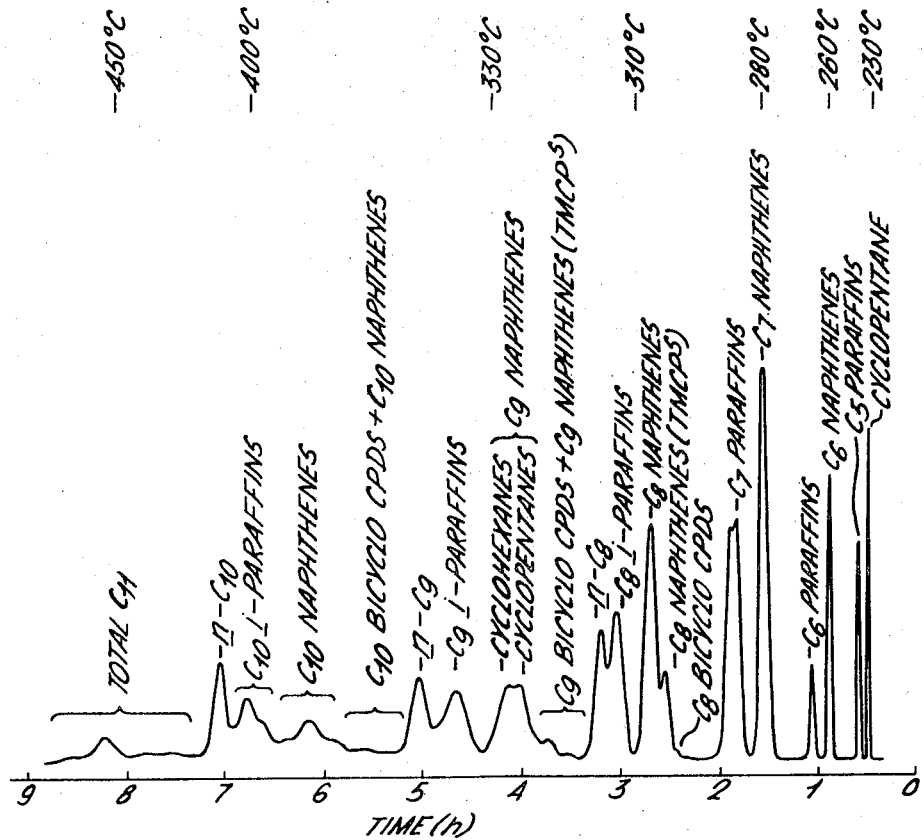

This invention relates to the separation of hydrocarbons from mixtures thereof by means of molecular sieves. In particular the invention relates to the separation of hydrocarbon mixtures into aromatics and non-aromatic carbon number fractions, the fraction of a given carbon number further being separated according to hydrocarbon type, i.e. into naphthenes and paraffins.

It is well known that certain natural and synthetic zeolites have the property of preferentially adsorbing certain types of hydrocarbons. These zeolites, known as molecular sieves, have crystalline structures containing a large number of pores of uniform size. In different zeolites these pores may be from 4 A. to 15 A. in diameter, but in any one zeolite the pores will be of substantially uniform size.

The present invention provides a process for separating hydrocarbon mixtures containing naphthene and paraffin hydrocarbons, having up to 11 carbon atoms per molecule into fractions each consisting substantially of naphthenic or paraffinic hydrocarbons having the same number of carbon atoms per molecule which process comprises passing the hydrocarbon mixture in the vapour phase together with a carrier gas through a column of a molecular sieve having the crystal structure of faujasite and having a pore diameter greater than 5 A. and temperature programming the column within the range 40 to 250 degrees centigrade above the average boiling point of the highest carbon number component present, the temperature programming being at such a rate that the fractions are removed from the column as successive effluents.

The invention further provides a process for separating hydrocarbon mixtures containing naphthene and paraffin hydrocarbons having up to 8 carbon atoms per molecule and also containing aromatic hydrocarbon into an aromatic fraction and fractions each consisting substantially of naphthenic or paraffinic hydrocarbons having the same number of carbon atoms per molecule which comprises passing the hydrocarbon mixture in the vapour phase together with a carrier gas through a column of a molecular sieve having the crystal structure of faujasite and having a pore diameter greater than 5 A., and temperature programming the column within the range 40 to 250 degrees centigrade above the average boiling point of the highest carbon number component present, the temperature programming being at such a rate that the fractions are removed from the column as successive effluents and recovering the naphthenic and paraffinic fractions separately from the column and then recovering the aromatic fraction from the column.

The invention still further provides a process for separating hydrocarbon mixtures containinng naphthene and paraffin hydrocarbons having up to 11 carbon atoms per molecule and also containing aromatic hydrocarbons into an aromatic fraction and fractions each consisting substantially of naphthenic or paraffinic hydrocarbons having the same number of carbon atoms per molecule which comprises passing the hydrocarbon mixture in the vapour phase together with a carrier gas through a first column of a molecular sieve having the crystal structure of faujasite and having a pore diameter greater than 5 A., in which the sieve is in the base exchanged form and then through a second column of a molecular sieve having a pore diameter greater than 5 A., recovering the aromatic fraction from the first column and temperature programming the second column within the range 40 to 250 degrees centigrade above the average boiling point of the highest carbon number component present the temperature programming being at such a rate that the fractions are removed from the second column as successive effluents and recovering the naphthenic and paraffinic fractions.

A feedstock containing aromatics and up to $C_8$ naphthenes and paraffins may conveniently be separated using a single column because the aromatics elute slowly after the last of the saturates, the aromatics being more strongly held by the sieve. In particular benzene and toluene are the first aromatics to be eluted and higher aromatics, if present, subsequently.

A feedstock containing aromatics and up to $C_{11}$ naphthenes and paraffins must be separated using two columns because in a single column the lower aromatics would be eluted concurrently with the $C_9$ and $C_{10}$ naphthenes and paraffins. Preferably in the two-column separation process the first column is shorter than the second column. Preferably also the sieve used in the first column is a base exchanged sieve in which some or all of the sodium ions of the sieve are replaced by cations whose charge and ionic radii are such that the charge distribution in the sieve pores, and consequently the energy of interaction with aromatics, are greater than in the case of the sodium form. In particular some or all of the sodium ions may be replaced by alkaline earth metal ions. Most particularly these ions may be calcium ions.

Both natural and synthetic faujasites are useful in this process. Natural faujasite is a crystalline zeolite whose composition can be represented as a mixture of the oxides of calcium, sodium, aluminium and silicon. Typical samples that have been analysed have the following compositions, expressed in mole ratios of oxides present:

|  | I | II | III |
|---|---|---|---|
| Calcium oxide | 0.54 | 0.51 | 0.41 |
| Sodium oxide | 0.43 | 0.49 | 0.58 |
| Aluminium oxide | 1.00 | 1.00 | 1.00 |
| Silicon oxide | 5.00 | 4.64 | 4.54 |

The mole ratio of the sum of the calcium oxide and sodium oxide to alumina varies as follows:

$$\frac{CaO + Na_2O}{Al_2O_3} = 1.0 \pm 0.1$$

The mole ratio of silica to alumina lies within the following range:

$$1 \pm 0.1 \frac{M_2O}{n} : 1 Al_2O_3 : 4.75 \pm 0.25\ SiO_2 : YH_2O$$

In the above formula, M is one or a number of cations having a valence of not more than three and $n$ is the valence state of the cation. Y may be any value up to about 8.

Before natural faujasite may be used in the process of the invention, at least a part of its adsorbed water must be removed, for example heating the faujasite to temperatures of about 250° C. has given excellent results. Faujasite can be dehydrated by heating to less than about 700° C. without destroying the crystal structure.

Recently certain synthetic faujasites have become commercially available. Their preparation and characteristics are discussed in French Pat. No. 1,117,756. The general formula for the synthetic faujasites is:

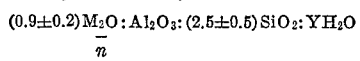

In this formula M represents a metal, $n$, its valence and Y may be any value up to 8, depending on the identity of the metal and the degree of hydration of the crystal. The pores of freshly prepared synthetic faujasite are filled with water and the crystal is activated prior to use by dehydration at temperatures up to 700° C.

The molecular sieves used in both columns of the two column process and in the single column processes have preferably a large pore diameter. For example the commercially available Type 10X and more particularly the Type 13X sieves, which have pore diameters of 8 A. and 9 A., respectively, are suitable. The molecular sieve used in the second column of the two column process is preferably in the sodium form. That used in the single column processes may be in the sodium form or in the base-exchanged form.

The aromatics may be eluted from the first column in the two-column process by reversing the carrier gas flow and backflushing before the first of the saturate hydrocarbons emerges from the second column.

Suitable carrier gases include, for example, helium, nitrogen and hydrogen.

By the term "temperature programming" we mean raising the temperature with time.

The processes of the invention are capable of separating a hydrocarbon fraction boiling up to 200° C., and having up to 11 carbon atoms per molecule, into a fraction containing total aromatics, if present, and further fractions by carbon number, each carbon number fraction being separated into naphthenes or paraffins and further separates isomers within the hydrocarbon types naphthenes and paraffins according to their degree of substitution. The respective orders of elution are: by increasing carbon number; naphthenes, paraffins: by decreasing degree of substitution of isomers.

It is essential that the residence time of hydrocarbons on the sieve is such that hydrocarbon type separation occurs within each carbon number. The residence time will depend on column length, operating temperature, column loading and sieve activity. The preferred operating temperature increases with increasing carbon number. Thus for $C_5$ hydrocarbons the operating temperature is preferably from 140 to 180° C. above the average boiling point and for $C_7$ and $C_{10}$ it is from 150 to 200° C. and 170 to 230° C. above the average boiling point respectively.

The process of the present invention is suitable for the separation of naphthenes and paraffins containing compounds of same carbon number, or for separating complex mixtures containing a range of compounds of different carbon numbers. Typical mixtures to be separated contain a carbon number spread of a least 3 i.e. the carbon number of the highest boiling component differs from the carbon number of the lowest boiling component by at least 2.

Hydrocarbon fractions boiling up to and including $C_7$ hydrocarbons can be treated according to the invention with commercially available molecular sieves. For $C_8$ and higher carbon number hydrocarbons, however, the molecular configurations of naphthenes and paraffins are such that the energies of interaction of the hydrocarbon types, and hence their retention times on the sieve are more similar than at lower carbon numbers. Moreover, at these higher carbon numbers the retention times are comparatively long to achieve good separation, and irreversible adsorption of the highest carbon number material may occur. This may be avoided by deactivation of the sieve surface. Preferably this is performed by treatment with dilute aqueous alkali solution, for example, 2 or 3% wt. sodium hydroxide solution, after which the sieve is dried, heated, packed in the column to be used according to the invention, heated again and swept with inert gas. Since selectivity can also be varied by varying the temperature at which the separation is carried out within the limits described previously, it is possible by using alkali treatment and temperature to isolate particular groups of isomers at $C_8$ and higher levels.

In operating the process it is desirable to exclude oxygen from the system, especially when operating at temperatures above 300° C. Oxygen may be removed from the gas stream by passing through a reactor containing reduced copper gauze.

The process of the present invention is useful as an analytical technique, for example in refinery process stream monitoring operations, and may also or alternatively be used to obtain fraction of segregated naphthenes and paraffins at different carbon numbers for further examination. The separated fractions of the same carbon number may be collected and subjected to further separation, for example, by capillary column gas-liquid chromatography to thereby give a complete analysis of the hydrocarbon mixture. When used as an analytical technique a complete hydrocarbon analysis of naphthenes and paraffins up to $C_{11}$ and total aromatics can be obtained in less than 120 minutes. If a high rate of temperature programming is used this can be reduced. Since individual hydrocarbon impurities of the same carbon number in a process stream to be analysed will elute together there will be a significant improvement in the lower limit of detection of much impurities.

The invention is illustrated by the following examples.

EXAMPLE 1

Type 13X pelleted molecular sieve was screened to 40–60 mesh British Standard Sieve, and this material was used in separate columns for the separation of fractions for further analysis and for direct analysis, respectively. For the first of these a glass column 36 inches by $\frac{5}{32}$ inch internal diameter was used packed with sieve up to 2½ inches from the inlet and 1 inch from the outlet of the column. The sieve was treated with 3% NaOH to reduce its activity by percolating 3% wt. NaOH through a 12 x ½ inch column of sieve for 30 mins., washing with distilled water, drying, and heating to 450° C. for 3 hours. The inlet end of the glass column used for the separation was packed with inert material to cut down dead space and assist in vaporization of the sample. The column was heated using a heater block. The carrier gas was helium supplied at 80 mls./min. and a flame ionisation detector and a 30:1 sample splitter were used.

For the analytical estimation a chromatographic apparatus was used fitted with a column prepared by packing 3 ft. of stainless steel tubing of $\frac{3}{32}$ inch i.e. with 2 ft. 6 inches of the above sieve, treated as described above with NaOH to reduce its activity. The apparatus was started at 180° C. and temperature programmed at various rates given in FIG. 1 up to about 450° C. with a flame ionisation detector maintained at 350° C. and the injector block at 250° C. Helium was used as the carrier gas at a flow rate of 80 mls./min. Oxygen was excluded from the system by passing the gas stream through a reactor containing reduced copper gauze maintained at about 500° C. Optimum sample sizes for the column used ranged from 8 microlitres at $C_8$ to less than 4 microlitres at $C_{10}$.

Separated fractions were examined using gas-liquid chromatography and mass spectometry.

The abbreviations in the figures are those conventionally used and are as follows:

FIG. 1:
  TMCP$^s$=tetramethyl cyclopentanes

Figure 2:
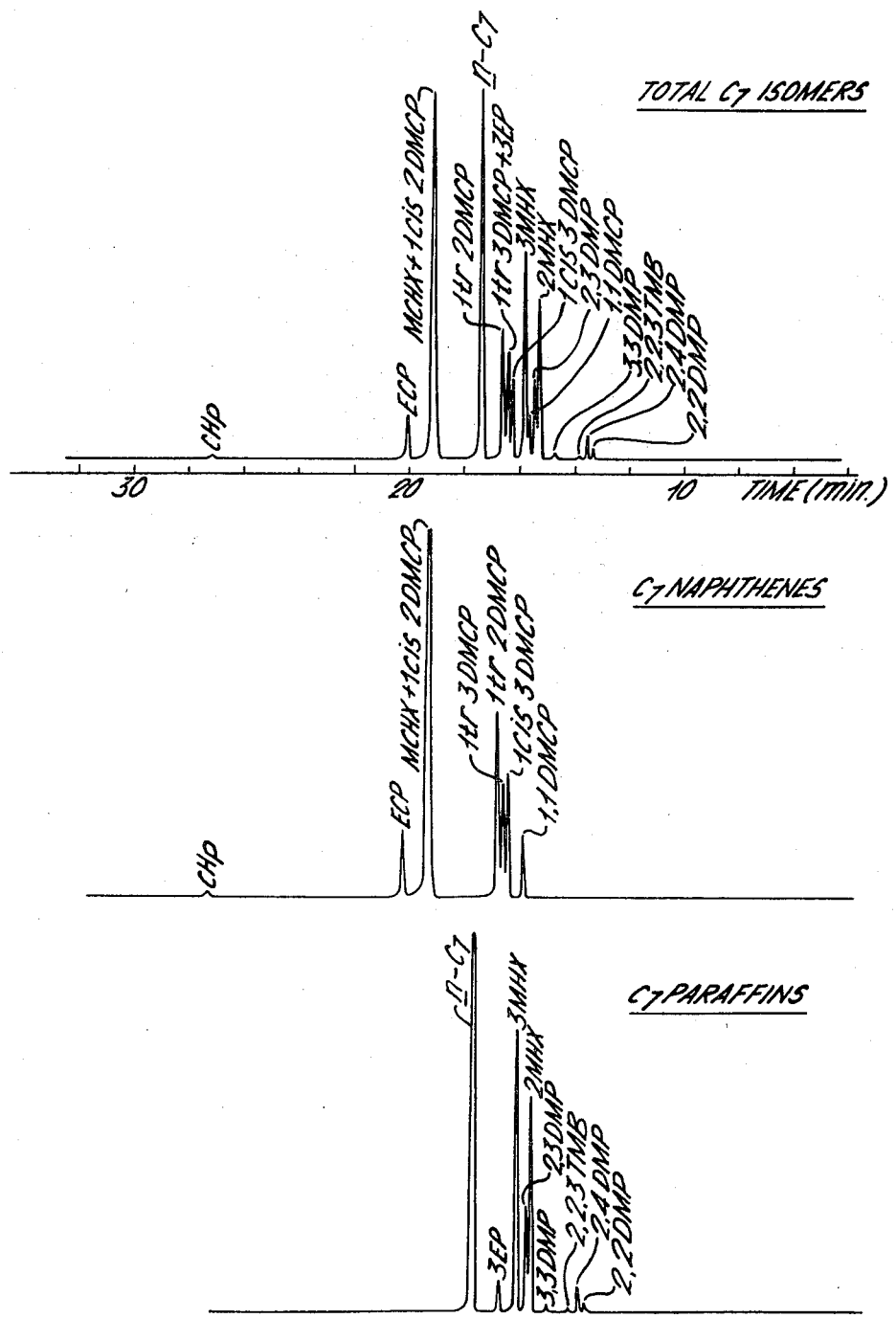
Figure 4:
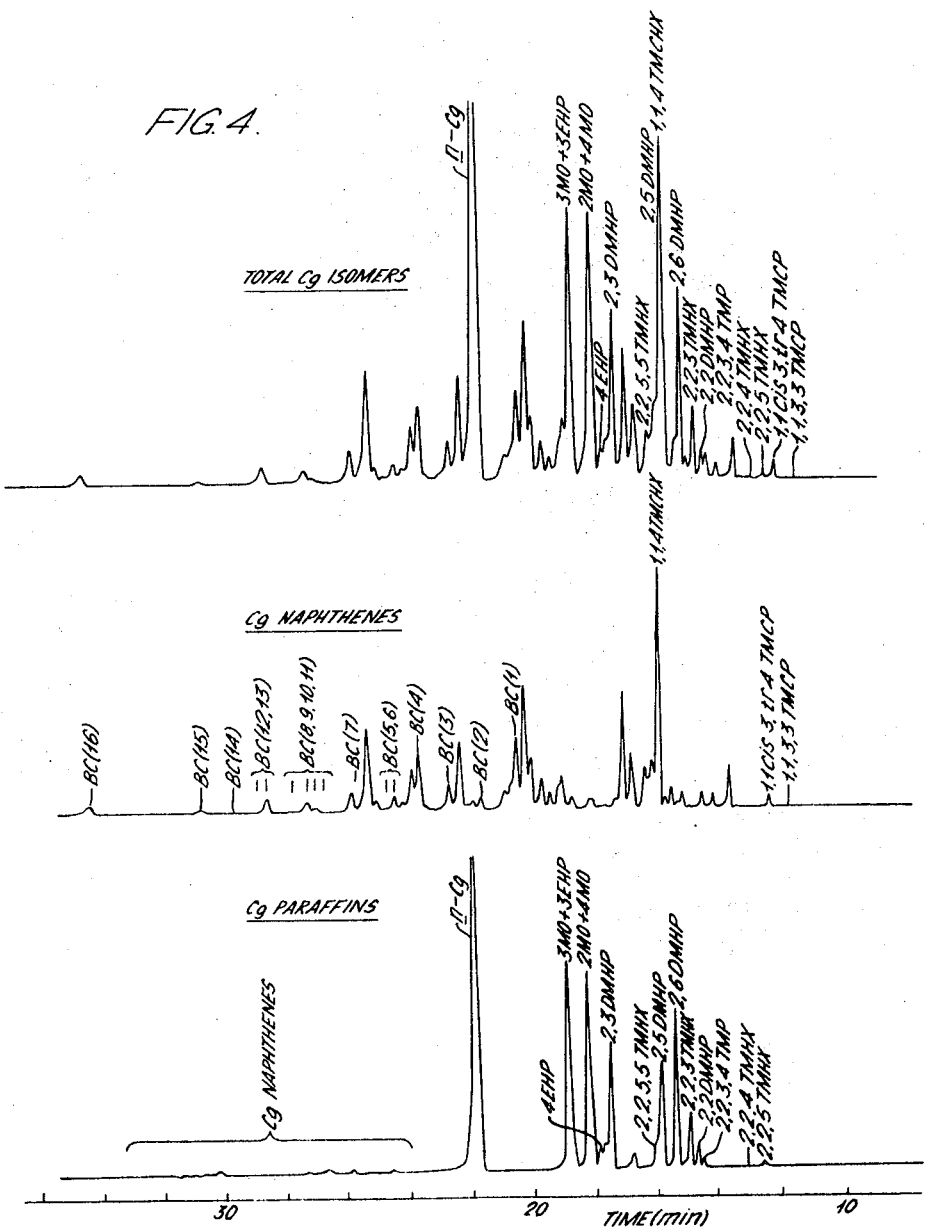
Figure 5:
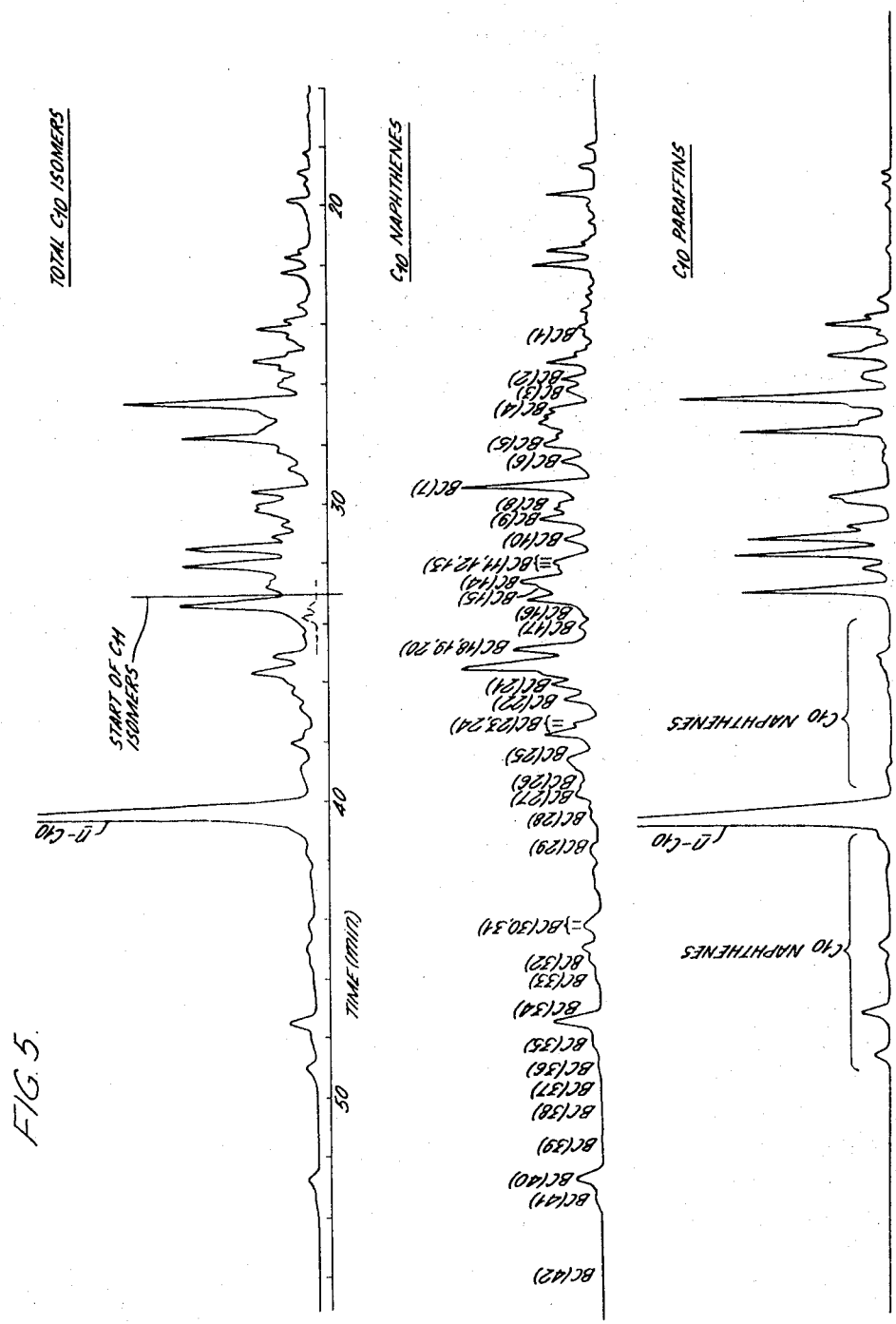

FIG. 2:
  DMP=dimethyl pentane
  TMB=trimethyl butane
  DMCP=dimethyl cyclopentane
  MHX=methyl hexane
  tr=trans
  EP=ethyl pentane
  CHP=cycloheptane FIG. 3:
  TMP=trimethyl pentane
  TMB=tetramethyl butane
  DMHX=dimethyl hexane
  TMP=trimethyl pentane
  TMCP=trimethyl cyclopentane
  MHP=methyl heptane
  DMCHX=dimethyl cyclohexane
  TMCP=trimethyl cyclopentane
  EMP=ethyl methyl pentane
  EHX=ethyl hexane
  EMCP=ethyl methyl cyclopentane
  BC=bicyclo
  MCHP=methyl cycloheptane
  ECHX=ethyl cyclohexane
  iso prop CP=isopropylcyclopentane
  n-prop CP=n-propylcyclopentane FIG. 4:
  MO=methyl octane
  EHP=ethyl heptane
  TMCHX=trimethyl cyclohexane
  TMCP=tetramethyl cyclopentane
  TMXH=trimethyl hexane
  DMHP=dimethyl heptane FIG. 1 is a reproduction of a chromatogram obtained as first described above. The sample size was 25 microlitres and the feedstock was an equivolume blend of Kuwait and Nigerian 45–185° C. dearomatised distillates.

FIGS. 2, 3, 4 and 5 are chromatograms of total isomers and naphthene and paraffin fractions of the equivolume blend of Kuwait and Nigerian 45–185° C. dearomatised distillate previously referred to. The fractions were collected and subjected to further chromatographic separation. The peaks were identified by capillary column gas-liquid chromatography. The abbreviations are those conventionally used, except that "BC" refers to bicyclic compounds. FIGS. 2 to 5 confirm that the separation effected in Example 1 are both by carbon number and type.

Figure 6:
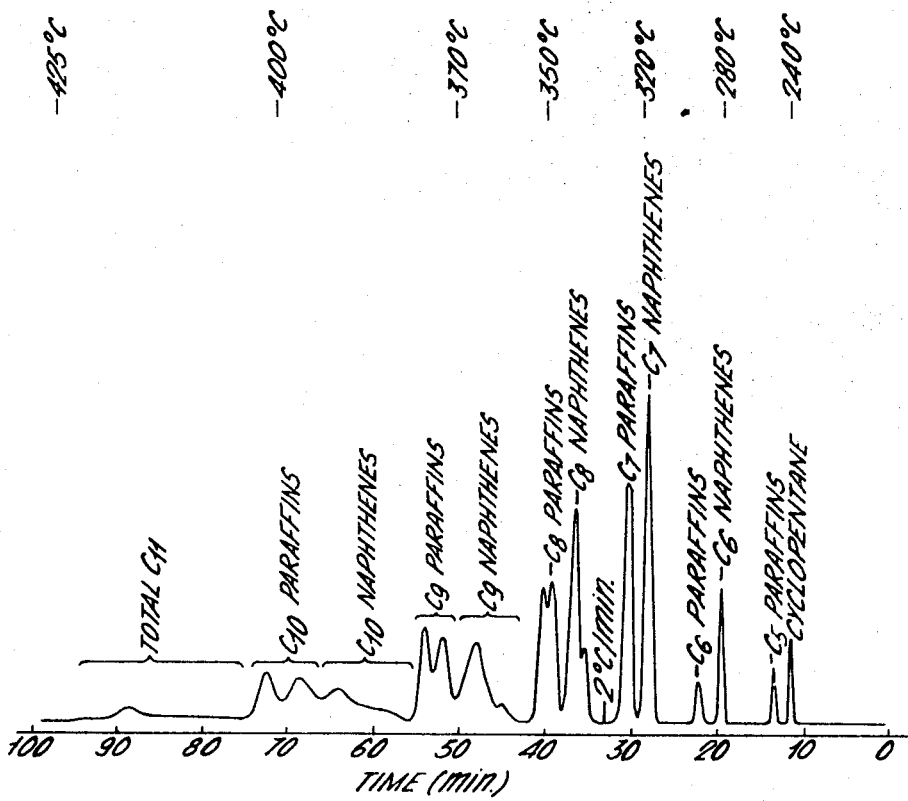

FIG. 6 is a chromatogram obtained using the column and method secondly described above, i.e. for analytical estimation.

EXAMPLE 2

0.1 microlitre of the feedstock of Example 1 was injected into a stream of 80 mls./min. of helium and passed into a column 3 ft. high and ⅛ inch outer diameter packed with the same molecular sieve as in Example 1 at an initial temperature of 200° C. which was raised initially at the rate of 2° C. per min., and which, after separation of the octanes, was raised at the rate of 1° C. per min. A separation into both carbon number fractions and into hydrocarbon types was obtained as illustrated in the accompanying FIG. 7 which is a reproduction of the monitoring chromatogram obtained in this experiment.

EXAMPLE 3

0.1 microlitre of a dearomatised Nigerian light naphtha boiling up to 150° C. was injected into a stream of 80 mls./min. of helium and passed into a column 2 ft. 6 inches high and packed with 40–60 mesh BSS Type 13X molecular sieve which had been pretreated with 3% wt. NaOH. The column temperature was initially 150° C. and this was raised at the rate of 20° C. per min. to a final temperature of 420° C. The separation obtained is illustrated in the accompanying FIG. 8 which is a reproduction of the monitoring chromatogram obtained in this experiment.

EXAMPLE 4

This example illustrates the separation of aromatics, naphthenes and paraffins. The first column was 3 inches x 5/32 inch internal diameter, was operated at 350° C. and a flow rate of 100 mls./minute of helium and contained 40–60 BSS mesh calcium 10X sieve. The second column was 24 inches long and contained 40–60 BSS mesh NaOH treated 13X sieve. It was temperature programmed from 60° C.–420° C. at the rate shown. The flow rate was 100 mls./minute and the carrier gas was helium. The feedstock was 0.2 microlitre of 15–150° C. naphtha. The first and second columns were connected in series. After 10 minutes the second column was bypassed and the thus isolated first column was cooled. The first column was then backflushed with carrier gas to elute the aromatics. After the aromatics had been eluted the backflushing was discontinued, the columns were reconnected in series and the second column was temperature-programmed to obtain the naphthene-paraffin portion of the feed. The accompanying FIG. 9 is a reproduction of the chromatogram obtained.

What we claim is:

1. A process for separating a hydrocarbon mixture containing naphthene and paraffin hydrocarbon, having up to 11 carbon atoms per molecule, into fractions each consisting substantially of naphthenic or paraffinic hydrocarbons having the same number of carbon atoms per molecule, which process comprises passing the hydrocarbon mixture in the vapour phase together with a carrier gas through a column of a molecular sieve having the crystal structure of faujasite and temperature programming the column within the range 40 to 250 degrees centigrade above the average boiling point of the highest carbon number component present, the temperature programming being at such a rate that the fractions are removed from the column as successive effluents.

2. A process according to claim 1 in which the mixture contains naphthene and paraffin hydrocarbons having up to 8 carbon atoms per molecule and also contains aromatic hydrocarbons and is separated into fractions each consisting substantially of naphthenic or paraffinic hydrocarbons having the same number of carbon atoms per molecule, the aromatic fraction being removed from the column after the naphthenic and paraffinic fractions.

3. A process according to claim 1 in which the mixture contains naphthene and paraffin hydrocarbons having up to 11 carbon atoms per molecule and also contains aromatic hydrocarbons and is separated into an aromatic fraction and fractions each consisting substantially of naphthenic or paraffinic hydrocarbons having the same number of carbon atoms per molecule, by passing the hydrocarbon mixture in the vapour phase together with a carrier gas through a first column of a molecular sieve having the crystal structure of faujasite, in which the sieve is in the base exchanged form and then through a second column of a molecular sieve having the crystal structure of faujasite, and recovering the aromatic fraction from the first column and the naphthenic and paraffinic fractions separately from the second column.

4. A process according to claim 3 in which the first column is shorter than the second.

5. A process according to claim 3 in which the base exchanged sieve used in the first column is one in which some or all of the sodium ions of the sieve are replaced by cations whose charge and ionic radii are such that the charge distribution in the sieve pores is greater than is the case of the sodium form.

6. A process according to claim 1 wherein the sieve or sieves used are of the Type 10X having a pore diameter of 8 A.

7. A process according to claim 1 wherein the sieve or sieves used are of the Type 13X having a pore diameter of 9 A.

8. A process according to claim 3 in which the sieve used in the second column is in the sodium form.

9. A process according to claim 3 in which the aromatics are eluted from the first column by reversing the carrier gas flow and backflushing before the first of the saturated hydrocarbons emerges from the second column.

10. A process according to claim 1 wherein the operating temperatures of the column, or in the case of two columns the operating temperature of the second column is for $C_5$ hydrocarbons 140 to 180° C. above the average boiling point and for $C_7$ and $C_{10}$ hydrocarbons from 150 to 200° C. and 170 to 230° C. above the average boiling point respectively.

11. A process according to claim 1 wherein the sieve, or in the case of two columns the sieve in the second column, has been previously treated with a dilute aqueous alkali solution.

12. A process according to claim 11 wherein the dilute aqueous alkali is a sodium hydroxide solution.

13. A process according to claim 12 wherein the solution is a 2–3% sodium hydroxide solution.

References Cited

UNITED STATES PATENTS

| | | | |
|---|---|---|---|
| 2,987,471 | 6/1961 | Eggertsen | 208—310 |
| 2,988,503 | 6/1961 | Milton et al. | 260—676 |
| 3,360,582 | 12/1967 | Mattox | 208—310 |
| 3,409,544 | 11/1968 | Cottle | 208—310 |

FOREIGN PATENTS 1,008,379  10/1965  Great Britain _____ 208—310

HERBERT LEVINE, Primary Examiner

U.S. Cl. X.R.

23—232 C; 55—67, 75; 260—676 MS